US006795032B2

(12) United States Patent
Ieda et al.

(10) Patent No.: US 6,795,032 B2
(45) Date of Patent: Sep. 21, 2004

(54) ANTENNA DEVICE

(75) Inventors: Kiyokazu Ieda, Chiryu (JP); Yuichi Murakami, Chiryu (JP); Eiji Mushiake, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/304,916

(22) Filed: Nov. 27, 2002

(65) Prior Publication Data

US 2003/0122725 A1 Jul. 3, 2003

(30) Foreign Application Priority Data

Nov. 28, 2001 (JP) ....................................... 2001-363406

(51) Int. Cl.[7] ................................................. H01G 1/32
(52) U.S. Cl. ........................ 343/713; 343/711; 343/788
(58) Field of Search ................................ 343/711, 712, 343/713, 787, 788, 893; 340/5.72, 5.62

(56) References Cited

U.S. PATENT DOCUMENTS 5,134,392 A * 7/1992 Takeuchi et al. ........... 340/5.62
6,400,330 B1 * 6/2002 Maruyama et al. .......... 343/788
6,556,125 B1 * 4/2003 Rohrl ........................ 340/5.62
6,577,228 B1 * 6/2003 Tsuchida et al. ........... 340/5.72
2002/0163474 A1 11/2002 Ieda et al.

FOREIGN PATENT DOCUMENTS

| | | | |
|---|---|---|---|
| AU | 1998-98211 | B2 | 12/1998 |
| DE | 102 07 944 | A1 | 11/2002 |
| EP | 0 943 764 | A1 | 9/1999 |
| EP | 1 083 280 | A2 | 3/2001 |
| JP | 10-163746 | A | 6/1998 |
| JP | 2001-308629 | A | 11/2001 |
| JP | 2002-252521 | A | 9/2002 |
| WO | WO 02/095873 | A2 | 11/2002 |

* cited by examiner

*Primary Examiner*—Shih-Chao Chen
(74) *Attorney, Agent, or Firm*—Burns, Doane, Swecker & Mathis, L.L.P.

(57) ABSTRACT

An antenna device includes a door handle provided outside of a vehicle door for opening the vehicle door, and an antenna provided inside of the door handle and generating a magnetic field component in a direction different from a perpendicular direction to an outer surface of the vehicle door.

4 Claims, 7 Drawing Sheets

ANTENNA DEVICE

This application is based on and claims priority under 35 U.S.C. § 119 with respect to Japanese Application No. 2001-363406 filed on Nov. 28, 2001, the entire content of which is incorporated herein by reference.

FIELD OF THE INVENTION

This invention generally relates to an antenna device. More particularly, the present invention pertains to an antenna which is provided inside of a door handle for opening and closing a door, for communicating with an outside.

BACKGROUND OF THE INVENTION

A known antenna device is disclosed in Japanese Patent Laid-Open Publication No. 2001-308629. The disclosed device is shown in FIGS. 6, 7.

An antenna device 51, which is used as a part of a keyless entry device of a vehicle, is provided inside of a door handle 52 for opening a vehicle door 60. The antenna device 51 includes a first antenna 55 and a second antenna 58. The first antenna 55 includes a coil 54 wound around a ferrite core 53 and a resonant capacitor C6 connected to the ferrite core 53 in parallel which constitutes a parallel resonant circuit. The second antenna 58 includes a circular coil 56 accommodating therein the ferrite core 53, a link coil 57 which is formed by one end portion of the circular coil 56 being wound a predetermined number of times around the ferrite core 53, and a resonant capacitor C7 connected to the circular coil 56 in series which constitutes a series resonant 5 circuit.

An axial direction of the circular coil 56 is provided perpendicular to an outer surface of the vehicle door. A magnetic field component Hy generated by the circular coil 56 extends in a direction, making an angle of 90 degrees relative to the vehicle door (y-direction in FIG. 7). The vehicle door is a conductive board so that an image of a magnetic field component –Hy in an opposite direction to the magnetic field component Hy is generated by the vehicle door. The magnetic field component Hy generated by the circular coil 56 is thus cancelled by the magnetic field component –Hy in the opposite direction. In order to solve this problem, the antenna device 51 is provided with an electromagnetic wave absorbing material 59 between the circular coil 56 and the vehicle door 60.

However, a number of parts is increased and an assembly condition is lowered by providing the electromagnetic wave absorbing material 59, which is also restricted by a size of the door handle.

Thus, a need exists for the antenna device which addresses at least the foregoing drawback associated with other known antenna devices.

SUMMARY OF THE INVENTION

It is an object of the present invention to provide an antenna device which can ensure a required magnetic field strength generated by an antenna without increasing a number of parts.

According to a first aspect of the present invention, the antenna device includes a door handle provided outside of a vehicle door for opening the vehicle door, and the antenna provided inside of the door handle and generating a magnetic field component in a direction different from a perpendicular direction to an outer surface of the vehicle door.

According to a second aspect of the present invention, the antenna includes a first antenna for generating a first magnetic field component and a second antenna for generating a second magnetic field component. The first magnetic field component is generated in approximately parallel to the outer surface of the vehicle door. The second magnetic field component is generated perpendicular to the first magnetic field component.

According to a third aspect of the present invention, the first antenna includes a first resonant circuit having a first coil which axial direction is in parallel to the outer surface of the vehicle door and a first resonant capacitor connected to the first coil. The second antenna includes a second resonant circuit having a second coil which axial direction is perpendicular to the axial direction of the first coil and provided outside of the first antenna, a link coil connected to the second coil and wound in the same direction as that of the first coil, and a second resonant capacitor connected to the link coil.

According to a fourth aspect of the present invention, the antenna further includes a third antenna for generating a third magnetic field component, a fourth antenna for generating a fourth magnetic field component, and a fifth antenna for generating a fifth magnetic field component. The third magnetic field component is generated in approximately parallel to the outer surface of the vehicle door. The fourth magnetic field component is generated perpendicular to the third magnetic field component. In addition, the fifth magnetic field component is generated in approximately parallel to the outer surface of the vehicle door and also perpendicular to the third magnetic field component.

According to a fifth aspect of the present invention, the third antenna includes a third resonant circuit having a third coil which axial direction is in parallel to the outer surface of the vehicle door and a third resonant capacitor connected to the third coil. The fourth antenna includes a fourth resonant circuit having a fourth coil which axial direction is perpendicular to the axial direction of the third coil and provided outside of the third antenna, a link coil connected to the fourth coil and wound in the same direction as that of the third coil, and a fourth resonant capacitor connected to the link coil. Further, the fifth antenna includes a fifth resonant circuit having a fifth coil provided inside of the third antenna and the fourth antenna and which axial direction is in parallel to the outer surface of the vehicle door and also perpendicular to the axial direction of the third coil.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

Figure 3A:
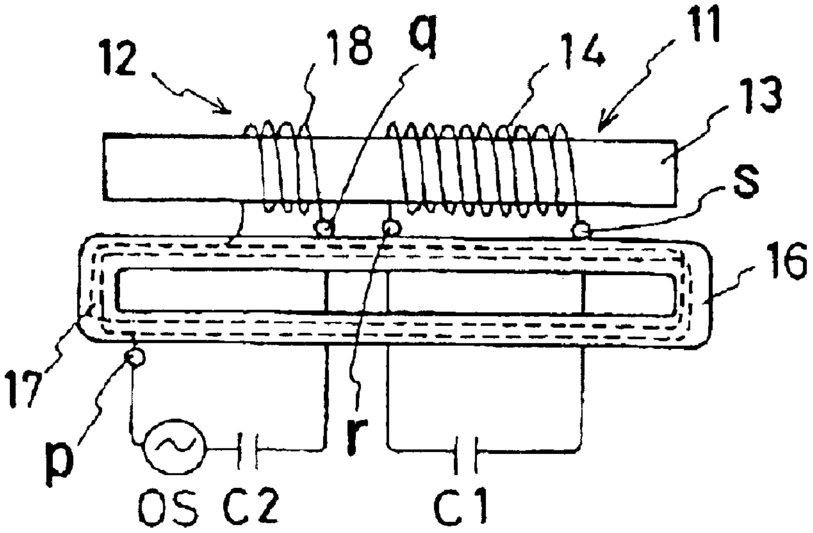
Figure 3B:
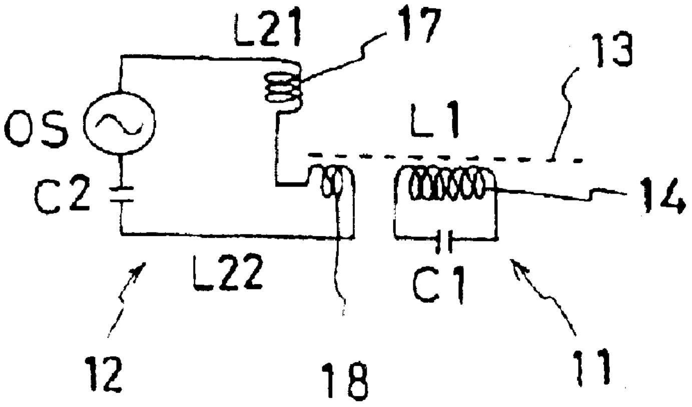

FIG. 3*a* is an explanatory view showing how coils are wound according to the first embodiment of the present invention;

FIG. 3*b* is a view of an equivalent circuit of the antenna device shown in FIG. 3*a;*

Figure 4:
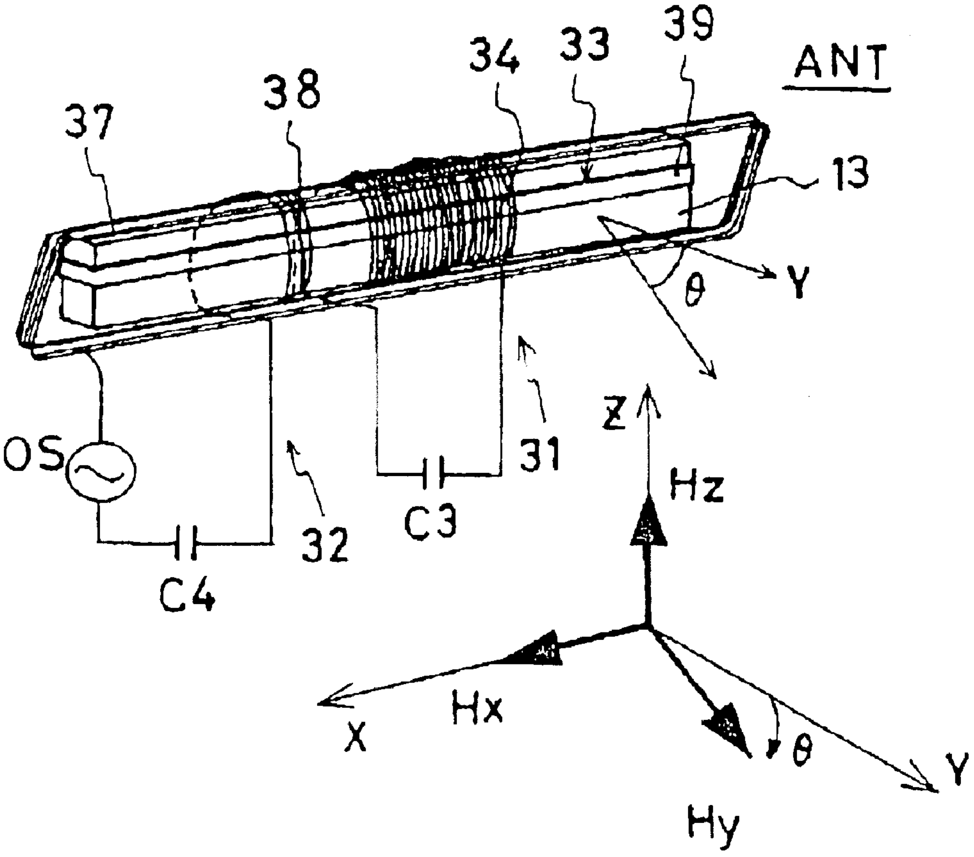
Figure 5A:
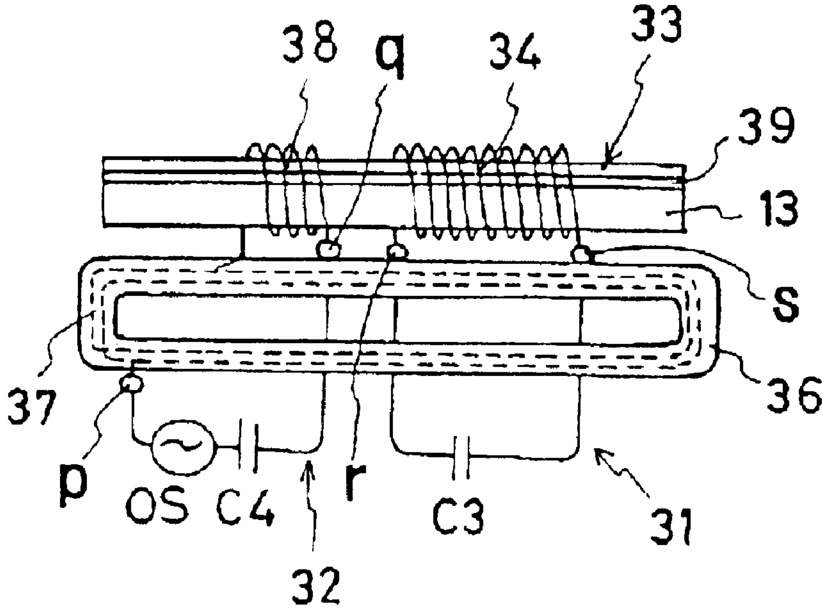
Figure 5B:
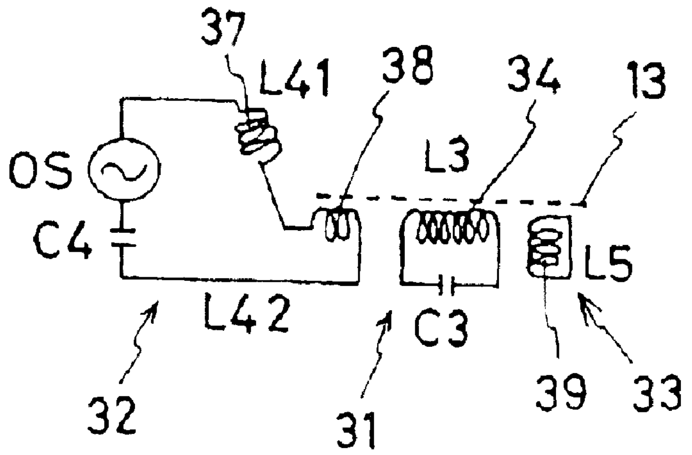

FIG. 4 is a perspective view of the antenna device according to a second embodiment of the present invention;

FIG. 5*a* is an explanatory view showing how the coils are wound according to the second embodiment of the present invention, FIG. 5*b* is a view of an equivalent circuit of the antenna device shown in FIG. 5*a;*

Figure 6:
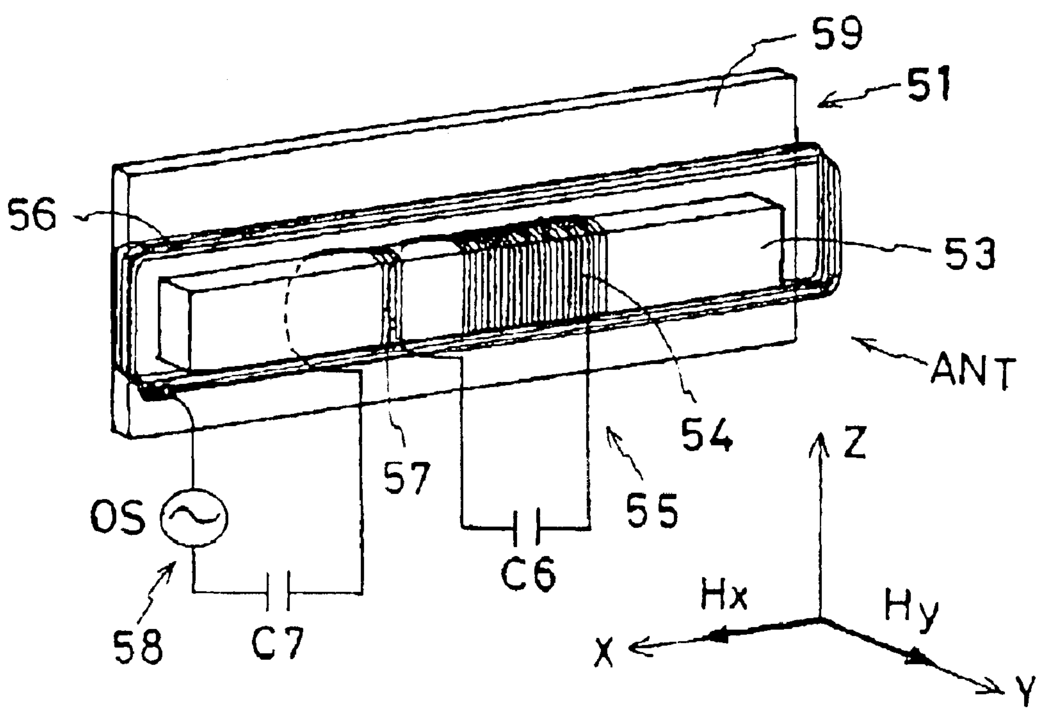
Fig. 6 Prior Art
Figure 7:
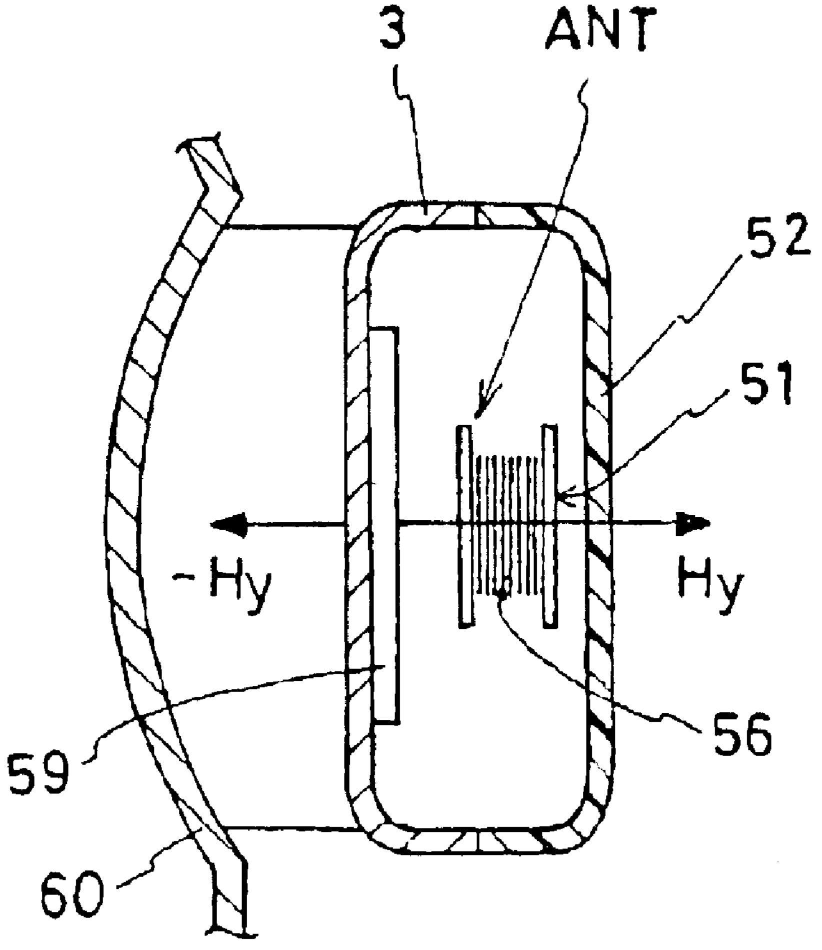
Fig. 7 Prior Art

FIG. 6 is a perspective view of a conventional antenna device;

FIG. 7 is a cross-sectional view of the conventional antenna device.

DETAILED DESCRIPTION OF THE INVENTION

Embodiments of the present invention will be explained referring to accompanying drawings.

Figure 1:
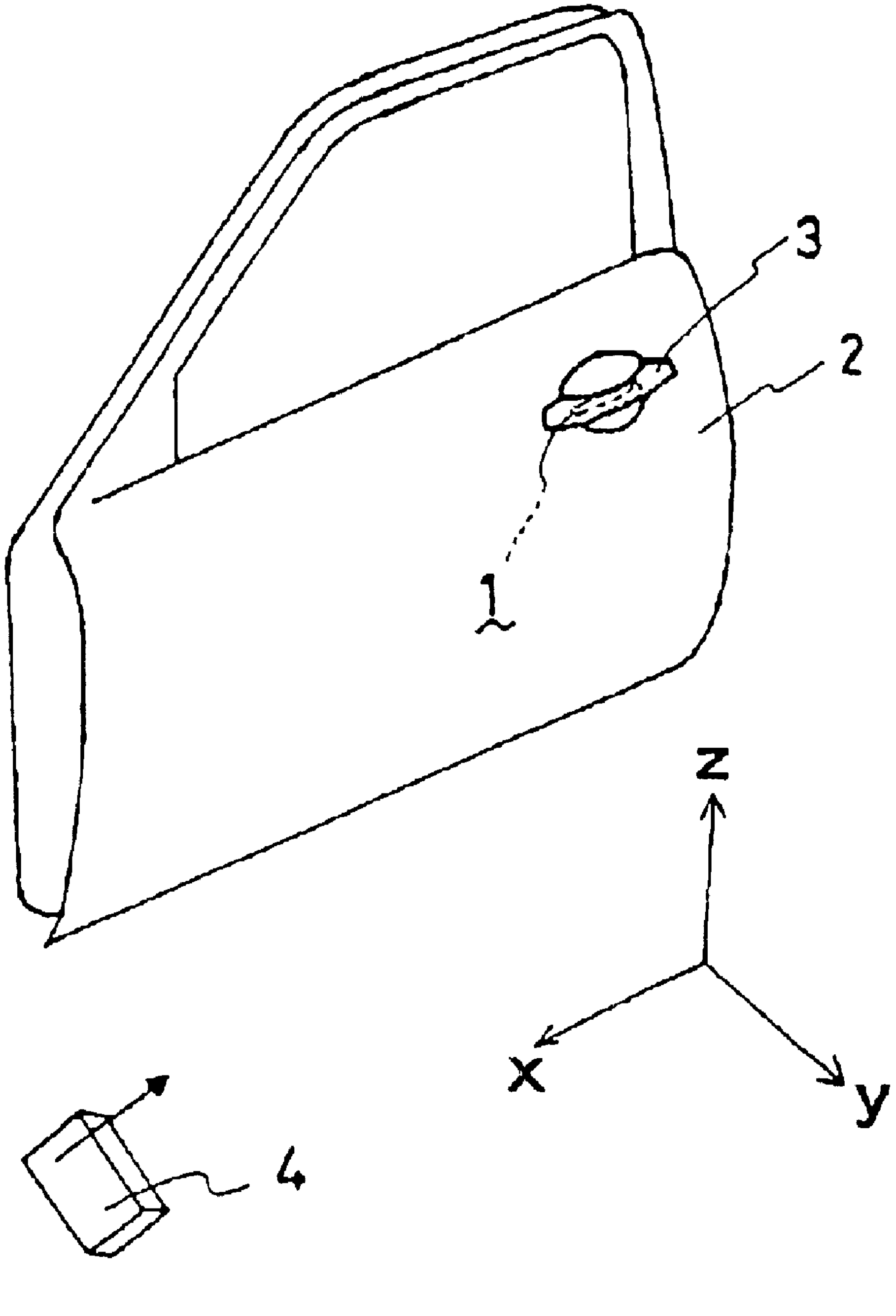
FIG. 1 is a perspective view of a vehicle door where an antenna device of the present invention is installed.

A door handle 3 for opening a vehicle door 2 relative to a vehicle body (not shown) is provided outside of the vehicle door 2 as shown in FIG. 1. The door handle 3 expands approximately in z-x plane and is opened by the door handle 3 to be pulled in an outside direction of the vehicle (y-direction in FIG. 1) so that a lock mechanism (not shown) provided inside of the vehicle door 2 is activated. An antenna device 1 provided inside of the door handle 3 generates a magnetic field component within a predetermined area and communicates with a portable device 4 called a remote control. The antenna device 1 is therefore used to determine whether a vehicle user carrying the portable device 4 is close to or away from the vehicle. The vehicle is then equipped with a system for allowing or prohibiting the lock mechanism to be activated (smart entry system) in accordance with a status whether the user is close to the vehicle or not.

Figure 2:
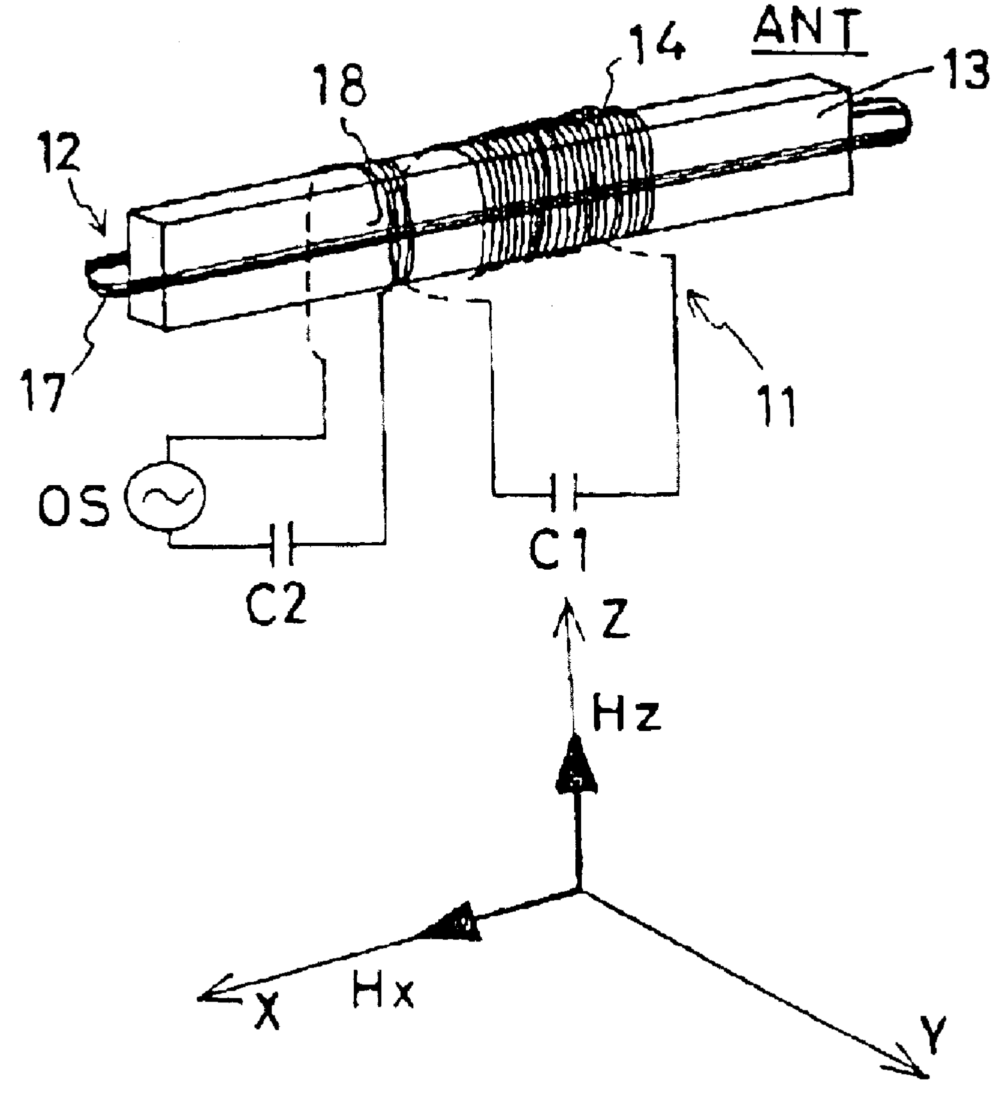
FIG. 2 is a perspective view of the antenna device according to a first embodiment of the present invention.

The antenna device 1 having a biaxial structure will be explained referring to FIGS. 2,3 as a first embodiment of the present invention.

The antenna device 1 has the biaxial structure as provided with a first antenna 11 and a second antenna 12. An antenna ANT consists of the first antenna 11 and the second antenna 12. The first antenna 11 is formed with a first coil 14 wound around a rectangular prism ferrite core 13 in a direction perpendicular to a longitudinal direction of the ferrite core 13 and a first resonant capacitor C1 connected between a terminal r and a terminal s shown in FIG. 2. The first resonant capacitor C1 is provided so that the first antenna 11 is resonated in parallel by a frequency f used for communication with the portable device 4. The ferrite core 13 is arranged so that the longitudinal direction thereof corresponds to x-direction as shown in FIG. 2. That is, the axial direction of the first coil 14 is provided in parallel to the vehicle door 2 and the first coil 14 is wound so as to expand in x-y plane. The ferrite core 13 is made of a material such as manganese-zinc and nickel-zinc for increasing the antenna efficiency. The ferrite core 13 can be in a round prism shape.

The second antenna 12 is formed with a second coil 17 wound around a bobbin 16 (shown in FIG. 3) provided outside of the ferrite core 13, a link coil 18 which is constituted by one end portion of the second coil 17 wound a predetermined number of times around the ferrite core 13, and a second resonant capacitor C2 connected between a terminal p and a terminal q-shown in FIG. 3. An oscillator OS and the second resonant capacitor C2 are connected to each other in series between the terminal p and the terminal q. The bobbin 16 is of an annular shape extending in the longitudinal direction of the ferrite core 13. That is, the second coil 17 is wound in the longitudinal direction of the ferrite core 13, which is a direction perpendicular to a winding direction of the first coil 14. The winding direction of the link coil 18 is same as that of the first coil 14. The second coil 17 is arranged so that a predetermined clearance is defined with the first coil 14 of the first antenna 11. The ferrite core 13 is shared between the first coil 14 and the second coil 17 for winding. The bobbin 16 is made of an insulative resin such as ABS resin and polycarbonate resin.

FIGS. 3*a*, 3*b* are views for explaining a structure of the antenna device 1 more in detail. FIG. 3*a* shows how the first coil 14 of the first antenna 11, the second coil 17 and the link coil 18 of the second antenna 12 are wound. FIG. 3*b* is an equivalent circuit of the antenna device 1 shown In FIG. 3*a*. L1, L21, and L22 in FIG. 3*b* are inductances of the first coil 14, the second coil 17, and the link coil 18 respectively.

As shown in FIG. 3*a*, the second antenna 12 is formed with a series resonant circuit (second resonant circuit), which is constituted by a series connection of the second coil 17, the link coil 18, and the second resonant capacitor C2. In addition, the first antenna 11 is formed with a parallel resonant circuit (first resonant circuit), which is constituted by a parallel connection of the first coil 14 and the first resonant capacitor C1. A coupling degree between the first antenna 11 and the second antenna 12 can be controlled by adjusting a number of turns of the link coil 18. The second resonant capacitor C2 is set to be resonated in series with a frequency used by the oscillator OS and also the first resonant capacitor C1 is set to be resonated in parallel with the frequency used by the oscillator OS.

Operation of the antenna device 1 will be explained as follows.

When the oscillator OS of the second antenna 12 is set into oscillation, the first coil 14 of the first antenna 11 is excited via the link coil 18 of the second antenna 12. A current is then supplied to the first coil 14. A magnetic field Hx in x-direction (first magnetic field component) is generated by the link coil 18 and the first coil 14 as shown in FIG. 2. At the same time, when the oscillator OS is set into oscillation, a magnetic field Hz in z-direction (second magnetic field component) is generated by the second coil 17 of the second antenna 12. By referring to FIG. 1, the magnetic field Hx is generated in parallel to the vehicle door 2. In addition, the magnetic field Hz is generated in parallel to the vehicle door 2 and also perpendicular to the magnetic field Hx. That is, both magnetic fields Hx and Hz are generated in a direction different from a perpendicular direction to the vehicle door 2 (y-direction). A cancellation effect by the vehicle door 2 of the conductive board is less on the magnetic field component. Thus, the magnetic fields Hx and Hz can be provided with a required strength of the magnetic field component. In addition, the magnetic fields Hx and Hz cross at right angles to each other so that a range of the magnetic field component generated by the antenna device 1 becomes larger. The antenna of the portable device 4 mentioned above is desirably provided with one-axis structure as a matter of miniaturization. It is thus very important that the range of the magnetic field component can be set larger and the required strength of the magnetic field is secured as in the present embodiment of the antenna device 1. The magnetic field Hz is generated in a vertical direction of the vehicle, i.e., a direction perpendicular to y-direction according to the embodiment of the present invention. However, the magnetic field Hz is not limited to be perpendicular to y-direction. That is, the magnetic field Hz can be generated in a direction with a predetermined angle more than 0 degree relative to y-direction. To acquire the direction of the magnetic field Hz with the predetermined angle, the angle of the second coil 17 relative to the vehicle door 2 can be adjusted.

The antenna device 1 having a triaxial structure will be explained referring to FIGS. 4,5 as a second embodiment of the present invention The antenna device 1 has a triaxial structure as provided with a third antenna 31, a fourth antenna 32 and a fifth antenna 33. The antenna ANT consists of the third antenna 31, the fourth antenna 32 and the fifth antenna 33. The third antenna 31 is formed with a third coil 34 wound around the rectangular prism ferrite core 13 in the direction perpendicular to the longitudinal direction of the ferrite core 13, and a third resonant capacitor C3 connected between the terminal r and the terminal s shown in FIG. 5. The third resonant capacitor C3 is provided so that the third antenna 31 is resonated in parallel to the frequency f used for communication with the portable device 4. The ferrite core 13 is arranged so that the longitudinal direction thereof corresponds to x-direction as shown in FIG. 4. That is, an axial direction of the third coil 34 is provided in parallel to the vehicle door 2 and the third coil 34 is wound so as to expand in x-y plane.

The fourth antenna 32 is formed with a fourth coil 37 wound around a bobbin 36 (shown in FIG. 5) provided outside of the ferrite core 13, a link coil 38 which is constituted by one end portion of the fourth coil 37 wound a predetermined number of times around the ferrite core 13, and a fourth resonant capacitor C4 connected between the terminal p and the terminal q shown in FIG. 5. The oscillator OS and the fourth resonant capacitor C4 are connected to each other in series between the terminal p and the terminal q. The bobbin 36 is of an annular shape extending in the longitudinal direction of the ferrite core 13. The axial direction of the fourth coil 37 is not set in a direction perpendicular to z-x plane or not parallel to y-direction. Specifically, the axial direction of the fourth coil 37 is set in a direction deviating from a positive y-direction with a predetermined angle θ (other than 0 degree) in y-z plane as shown in FIG. 4. In addition, the axial direction of the fourth coil 37 is set to be only rotated in y-z plane and thus still perpendicular to the axial direction of the third coil 34 of the third antenna 31. The winding direction of the link coil 38 is same as that of the third coil 34. The fourth coil 37 is provided so that a predetermined clearance is defined with the third coil 34 of the third antenna 31. The ferrite core 13 is shared between the fourth coil 37 and the third coil 34 for winding.

The fifth antenna 33 is formed with a fifth coil 39 wound around the ferrite core 13 directly in the longitudinal direction of the ferrite core 13, which is a winding direction of the fifth coil 39. That is, the fifth coil 39 is wound inside of the third coil 34 of the third antenna 31, the fourth coil 37 and the link coil 38 of the fourth antenna 32. The axial direction of the fifth coil 39, is perpendicular to that of the third coil 34. According to the present embodiment, a copper foil ribbon is used for the fifth coil 39.

FIG. 5*a*, 5*b* are views for explaining the structure of the antenna device 1 more in detail. FIG. 5*a* shows how the third coil 34 of the third antenna 31, the fourth coil 37 and the link coil 38 of the fourth antenna 32, and the fifth coil 39 of the fifth antenna 33 are wound. FIG. 5*b* is an equivalent circuit of the antenna device 1 shown in FIG. 5*a*. L3, L41, L42 and L5 in FIG. 5*b* are inductances of the third coil 34, the fourth coil 37, the link coil 38 and the fifth coil 39 respectively.

The fourth antenna 32 is formed with a series resonant circuit (fourth resonance circuit), which is constituted by a series connection of the fourth coil 37, the link coil 38, and the fourth resonant capacitor C4. In addition, the third antenna 31 is formed with a parallel resonant circuit (third resonant circuit), which is constituted by a parallel connection of the third coil 34 and the third resonant capacitor C3. A coupling degree between the third antenna 31 and the fourth antenna 32 can be controlled by adjusting a number of turns of the link coil 38. A coupling degree among the fifth antenna 33, the third antenna 31, and the fourth antenna 32 can be controlled by a winding position of the fifth coil 39 at the ferrite core 13 and a number of turns of the fifth coil 39. The coupling degree is varied according to a position of the fifth coil 39 in z-direction relative to the ferrite core 13. The fifth coil 39 is directly wound around the ferrite core 13 so that a required L3 value can be obtained by a several turns according to the present embodiment.

The operation of the antenna device 1 will be explained as follows.

When the oscillator OS of the fourth antenna 32 is set into oscillation, the third coil 34 of the third antenna 31 is excited via the link coil 38. The current is then supplied to the third coil 34. The magnetic field Hx in x-direction (third magnetic field component) is generated by the link coil 38 and the third coil 34 as shown in FIG. 4. At the same time, when the oscillator OS is set into oscillation, the magnetic field Hy (fourth magnetic field component) is generated in a direction deviating from the positive y-direction with the angle θ in y-z plane. A magnetic field Hz (fifth magnetic field component) in z-direction is generated by the fifth coil 39. By referring to the FIG. 1, when the ferrite core 13 is provided in parallel to the vehicle door 2, the magnetic field Hx is generated in parallel to the vehicle door 2. In addition, the magnetic field Hz is generated in parallel to the vehicle door 2 and also perpendicular to the magnetic field Hx. The magnetic field Hy is generated in a direction deviating from a direction perpendicular to the vehicle door 2 with the angle θ (downward direction in FIG. 4). That is, each magnetic field Hx, Hy, or Hz is generated in a direction different from the direction perpendicular to the vehicle door 2 (y-direction). Thus, a cancellation effect by the vehicle door 2 of the conductive board is less on the magnetic field component. The magnetic fields Hx, Hy and Hz can be provided with the required strength of the magnetic field components. The magnetic fields Hy and Hz are provided in a plane perpendicular to the magnetic field Hx so that a range of the magnetic field component generated from the antenna device 1 becomes larger. According to the present embodiment, the antenna obtains the triaxial structure so that the strength of the magnetic field component can be more assured than the antenna with the biaxial structure. The communication of the antenna with the portable device 4 becomes more efficient accordingly. The value θ can be negative according to the present embodiment, i.e., the direction of the magnetic field Hy can be set inclined to z-direction. To acquire the predetermined angle of θ, an angle of the bobbin 36 relative to the ferrite core 13 can be adjusted.

According to the present invention, the magnetic field component is generated by the antenna in the direction different from the perpendicular direction to the vehicle door. Thus, the magnetic field component generated by the vehicle door, which is generated in the direction opposite to that of the magnetic field component, is prevented.

That is, the magnetic field component generated by the antenna is not cancelled by the vehicle door so that the required strength of the magnetic field component can be assured.

The magnetic field components with plural axes generated by the antenna cross at right angles to each other so that the range of the magnetic field components generated by the antenna becomes larger.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An antenna device comprising:

a door handle provided outside of a vehicle door for opening the vehicle door; and a plurality of antenna comprising a third first antenna for generating a first magnetic field component, a second antenna for generating a second magnetic field component, and a third antenna for generating a third magnetic field component, and wherein the first magnetic field component is generated approximately parallel to the outer surface of the vehicle door, the second magnetic field component is generated perpendicular to the first magnetic field component, and the third magnetic field component is generated approximately parallel to the outer surface of the vehicle door and also perpendicular to the first magnetic field component.

2. The antenna device according to claim 1, wherein:

the first antenna includes a first resonant circuit having a first coil which axial direction is in parallel to the outer surface of the vehicle door and a first resonant capacitor connected to the first coil, the second antenna includes a second resonant circuit having a second coil which axial direction is perpendicular to the axial direction of the first coil and provided outside of the first antenna, a link coil connected to the second coil and wound in the same direction as that of the first coil, and a second resonant capacitor connected to the link coil, and the third antenna includes a third resonant circuit having a third coil provided inside of the first antenna and the second antenna and which axial direction is in parallel to the outer surface of the vehicle door and also perpendicular to the axial direction of the first coil.

3. The antenna device according to claim 2, wherein:

the first resonant circuit is a parallel resonant circuit by a parallel connection of the first coil and the first resonant capacitor, and the second resonant circuit is a series resonant circuit by a series connection of the second coil, the link coil, and the second resonant capacitor.

4. The antenna device according to claim 1, wherein:

the second magnetic field component is generated in a direction deviating from a perpendicular direction to the vehicle door with a predetermined angle.

* * * * *